Feb. 22, 1966 C. L. COATES, JR., ETAL 3,237,111

APPARATUS FOR RECOGNIZING WAVEFORMS OF VARIABLE TIME DURATION REPRESENTING THE SPECTRUM OF WAVEFORMS ON A LOGARITHMIC SCALE

Filed Aug. 14, 1963

Inventors:
Clarence L. Coates, Jr.;
Philip M. Lewis, II,
by John P. DeWitt
Their Attorney United States Patent Office 3,237,111

Patented Feb. 22, 1966

3,237,111

APPARATUS FOR RECOGNIZING WAVEFORMS OF VARIABLE TIME DURATION REPRESENTING THE SPECTRUM OF WAVEFORMS ON A LOGARITHMIC SCALE

Clarence L. Coates, Jr., Scotia, and Philip M. Lewis II, Schenectady, N.Y., assignors to General Electric Company, a corporation of New York Filed Aug. 14, 1963, Ser. No. 302,212
5 Claims. (Cl. 328—139)

This invention relates to apparatus for recognizing unknown signals similar in shape but of varying time duration.

In the copending application of Charles V. Jakowatz, Serial No. 7,276, filed February 8, 1960, now Patent No. 3,114,884, and assigned to the assignee of the present invention, an apparatus is disclosed for recognizing an unknown repetitive signal buried in noise. The signal may, for example, comprise a radar return which is indistinguishable to the human observer. The signal is withdrawn from its background noise by storing a portion of noisy input as a reference, comparing further areas of input therewith until similarity or correlation is indicated, and pursuant to such indication proceeding to alter the stored reference by combining therewith portions of input which give rise to indications of similarity. The stored reference is improved over and over again and storage becomes an increasingly better representation of the unknown signal, while noise factors average out because of their incoherent nature.

The adaptive filter is effective in withdrawing a repetitive signal from background noise when each repetition of the signal is essentially identical. There are instances, however, when an unknown repetitive signal has the same characteristic shape upon each repetition, but is expanded or contracted on a time scale. For example in speech recognition, electrical signals representing a particular vowel have the same characteristic shape but are frequently expanded or contracted versions of one another. The same holds true for optical recognition of alphanumeric characters wherein repetitive electrical signals characterize a particular letter, number or portion thereof. The alpha-numeric character represented may be large or small, and in some instances somewhat differently formed, but still the character should be capable of producing a similarly shaped electrical representation. Another similar problem occurs in the case of output signals received from apparatus having a variable speed of operation, or in the instance of signals received from moving objects and therefore subject to a Doppler increase in wavelength.

It is therefore an object of the present invention to provide improved apparatus for recognizing unknown signals similar in shape but of varying time duration.

In the concurrently filed application of Charles V. Jakowatz, Serial No. 302,150, entitled "A Self Adapting Filter for Waveforms Similar in Shape," and assigned to the assignee of the present invention, an adaptive filter is set forth and claimed including electrical delay means acting to provide several outputs derived from a common electrical input. Each such output comprises a number of elements or time-spaced samples of electrical input, secured at spaced taps along a delay means. The time spacings for samples comprising different outputs are chosen to be different and this compensates for compression and expansion of the input signals. The various outputs are then compared with the stored version of the unknown signal, and when sufficient correlation is attained, the sampled output most nearly matching the stored version of the unknown signal is combined therewith. The foregoing apparatus is effective for detecting expanded and contracted signals, but employs a separate set of sampling means for each different sampling interval, and therefore results in a circuit more complex than the original adaptive filter.

It is therefore a purpose of the present invention to provide a somewhat more simplified apparatus for attaining in combination with an adaptive filter, the recognition of waveforms similar in shape but of varying time duration, and preferably an apparatus which may be placed between a conventional adaptive filter and an unknown signal channel.

In accordance with the present invention, the magnitude of a frequency spectrum of electrical input is continuously portrayed on a logarithmic scale and this representation is consecutively scanned for presentation to an adaptive filter. The logarithm has the property that multiplication becomes addition, and if a given input waveform has been expanded by a factor $k$, its spectrum will be contracted by that factor and vice versa. Because of these properties, if a given time waveform has been expanded or contracted, its spectrum magnitude plotted on a logarithmic frequency scale will be identical in shape and only translated in frequency. Consecutively scanning, or sampling, changes the frequency plot into a time plot with a frequency translation becoming a time translation. However the significance of the time translation is eliminated when circuitry in accordance with the present invention is coupled to an adaptive filter as hereinafter described.

In accordance with a particular embodiment of the present invention, electrical input containing an unknown signal is presented to a bank of filters, tuned for passing substantially separate frequency components of the electrical input, to form the frequency spectrum of the electrical input. The frequencies of these filters are selected to be equally spaced on a logarithmic frequency scale. The outputs of these filters are continuously sampled consecutively at equally spaced time intervals and coupled for recognition by an adaptive filter.

In our concurrently filed application, Serial No. 302,214, entitled "Apparatus for Recognizing Waveforms of Variable Time Duration," also assigned to the assignee of the present invention, we set forth and claim circuitry for an adaptive filter wherein the electrical input itself is logarithmically sampled. The apparatus of the present invention accomplishing recognition in the frequency domain has the advantage of simplicity of implementation as compared with the logarithmic sampling of the electrical input itself.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 1:
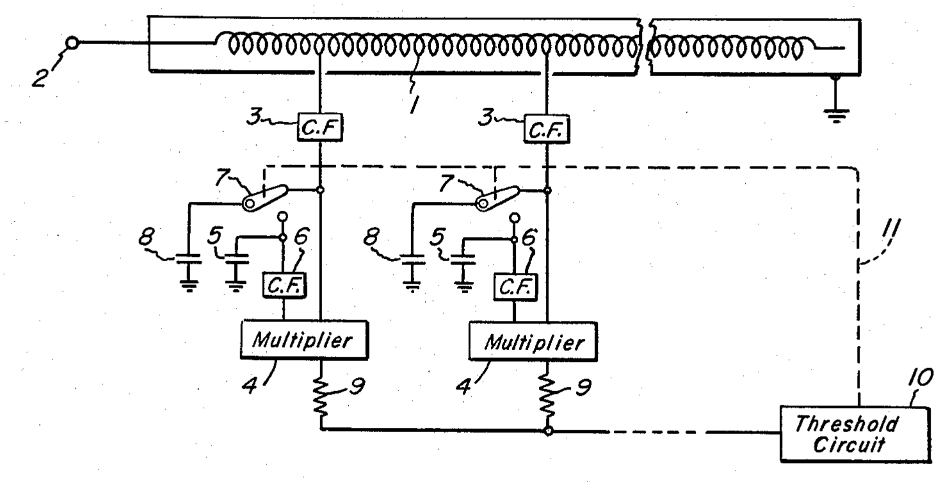
FIG. 1 is a simplified schematic diagram of the prior adaptive filter.

Referring to FIG. 1, an adaptive filter of the type disclosed and claimed in the copending application of Charles V. Jakowatz, Serial No. 7,276, includes a delay line 1, coupled to a source of electrical input at terminal 2. Cathode follower sampling means 3 tapped at spaced points along the delay line each provide an input for one of the multipliers 4 while the remaining input to each multiplier 4 is derived from a storage capacitor 5 through cathode follower 6. The outputs of multipliers 4 are summed through a summing network consisting of resistors 9 and applied as the input to a threshold circuit 10 arranged to actuate contacts 7, as indicated by dashed line 11, when the sum of the multiplications reaches a predetermined value. Single pole, double throw contacts 7 normally connect a sampling capacitor 8 to receive a delay line sample through cathode follower sampling means 3 in the normal switching position, and act to connect a sampling capacitor 8 directly across a storage capacitor 5 in the activated switching position.

As specifically disclosed in the aforementioned application of Charles V. Jakowatz, Serial No. 7,276, the sum applied to the threshold circuit 10 approximates the cross correlation function between the elements of electrical input distributed along delay line 1 and corresponding stored signal elements on storage capacitors 5. When the cross correlation function reaches a predetermined threshold, a predetermined degree of comparison between the incoming electrical input and stored values has been attained, and therefore threshold circuit 10 acts to close contacts 7 from the upper position to the lower position thereby connecting the respective sampling and storage capacitors 8 and 5 together. The capacitor 8 voltage will approximately equal a sample voltage at the corresponding delay line tap. The capacitors are connected together for a period of time, a charge equilibrium condition therebetween will be reached such that the stored value of voltage on storage capacitor 5 is influenced by the new sample value on sampling capacitor 8. Sampling capacitor 8 is thereupon reconnected to cathode follower sampling means 3 through a contact 7 to reassume the sample voltage along the delay line. After a number of occurrences of a repetitive signal, a fairly accurate representation thereof will be achieved on storage capacitors 5, even though the signal is initially unknown and somewhat obscured by background noise. A repetitive signal as referred to herein is not necessarily a periodic one.

Initially, since the incoming signal is unknown, the threshold established by threshold circuit 10 is set to very low; however, as a better and better representation of the signal becomes stored on storage capacitors 5, the threshold level of threshold circuit 10 is raised in response thereto, so it will become increasingly like that switch contacts 7 are actuated in response to the occurrence of the repetitive signal rather than noise.

Although the storage capacitors 5 store an increasingly valid representation of the input signal, the signal in storage is able to follow slow changes in form and relative time position of an input signal. It can be shown the stored value on a storage capacitor 5 will be more nearly representative of the more recent samples from capacitor 8, due to the interaction of capacitors 5 and 8 when connected together by contacts 7.

The above described filter is effective for recognizing a previously unknown repetitive signal buried in noise, but the signal most readily recognized is one of the same shape and of the same time duration. In accordance with the present invention, a signal will be recognized as as repetition of another if it is similar, that is, if two signals are the same except one is a stretched version of the other on a time scale.

In accordance with the present invention circuitry is provided for recognizing, in combination with an adaptive filter, waveforms similar in shape but of varying time duration. A reconstituted signal is coupled to the adaptive filter and comprises the magnetude of the frequency spectrum of electrical input. This frequency spectrum of electrical input is sampled at selected frequencies spaced on a logarithmic frequency scale.

Figure 2:
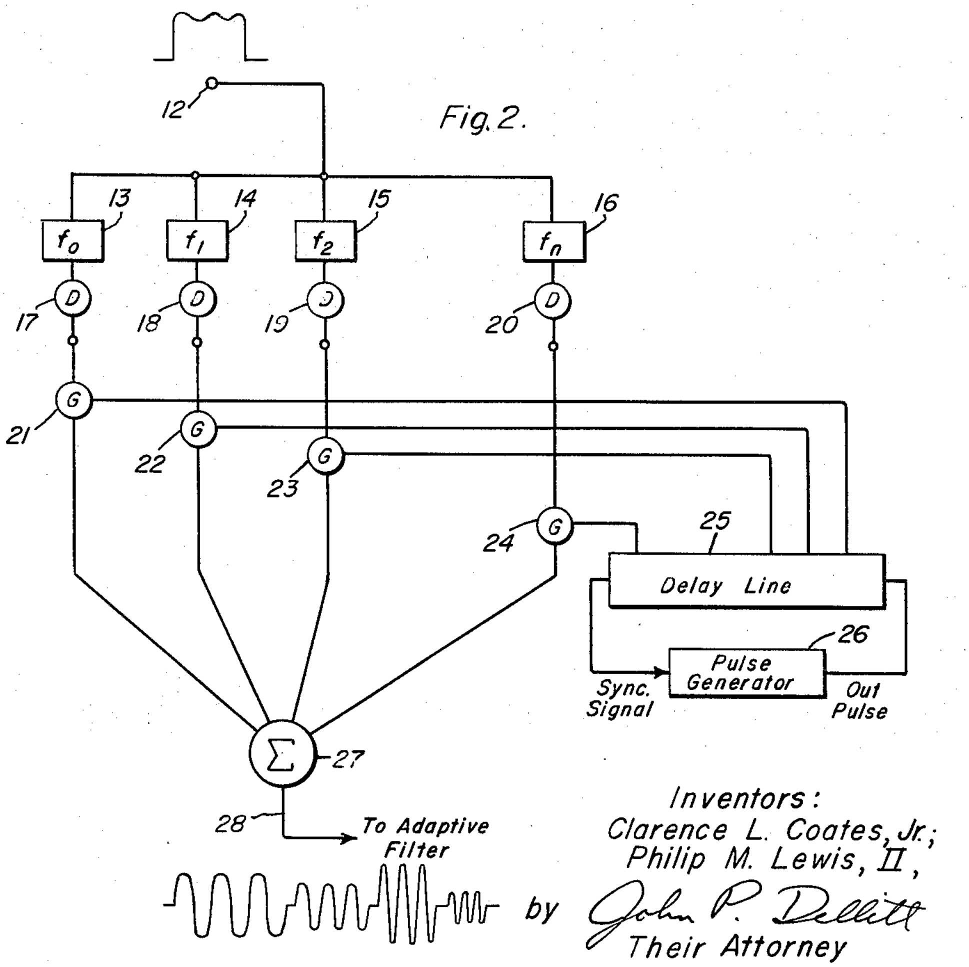
FIG. 2 is a schematic diagram of circuitry in accordance with the present invention employed in combination with the adaptive filter for recognizing an unknown signal of varying time duration.

Referring specifically to FIG. 2, electrical input from input terminal 12 is supplied to sampling filters 13, 14, 15 and 16 (the $n^{\text{th}}$ filter), each being effective to pass a frequency component of electrical input; the frequencies are designated $f_0, f_1, f_2, \ldots$ and $f_n$, respectively. These sampled frequencies are preferably established as follows: If $$f_1 - f_0 \text{ is equal to } \Delta f$$

then, $$f_j = f_0 + \Delta_f 2^{j-1}, \text{ for } j = 1, 2 \ldots n$$

In other words, the frequencies are desirably equally spaced on a logarithmic frequency scale.

The outputs of filters 13–16 are applied respectively to detectors 17–20 and the resulting rectified outputs are representative of the amplitudes of the frequency components. The detectors may comprise any convenient means of determining the envelope of a high frequency wave, as for example semiconductor rectifier circuits. The detected outputs are continually and consecutively sampled at equally spaced time intervals by gates 21, 22, 23 and 24 operated from delay line 25 in turn driven with pulse generator 26. Equally spaced taps along the delay line 25 consecutively activate gates 21–24 starting with gate 21 so that only one gate is conductive at any one time. The output end of the delay line conveniently provides a sync signal for pulse generator 26. The outputs from gates 21–24 are conveniently summed or coupled together at a common coupling means 27 provided with an output lead 28.

In operating the apparatus in accordance with the present invention, output lead 28 is connected to terminal 2 of the FIG. 1 adaptive filter. Initially, sampled magnitudes of a frequency spectrum representative of a portion of electrical input is stored upon storage capacitors 5 of the FIG. 1 filter. The magnitudes of scanned frequency spectrum of electrical input from the FIG. 2 circuit is then continuously compared with the reference stored on capacitors 5. Favorable comparison of the scanned spectrum and the previously stored version thereof results in the successfully compared spectrum being combined with the stored version. Repetition of a signal in electrical input will result in its spectrum magnitudes being added to storage even through successive repetitions are compressed or expanded in time, on account of the logarithmic frequency spacing of the input filters. The time-altered electrical input will result in frequency spectrum magnitudes merely altered in frequency on a logarithmic scale. When the frequency representation is scanned, only its time of arrival at the adaptive filter is affected. Although the frequency spectrum of the unknown signal is thus ultimately stored in common storage it is appreciated by those skilled in the art that the unknown signal is closely related thereto.

The logarithmic frequency separation between frequencies to which filters 13–16 are respectively tuned is related to the following theoretical considerations. First, if a given time waveform has been expanded by a factor, $k$, its spectrum will be contracted by that factor $k$ (and vice versa). Then the logarithm has the property that multiplication becomes addition; that is logarithm $kf = \log k + \log f$. Because of these two properties, if a given time waveform has been expanded by a factor of $k$, its spectrum will be contracted by factor $k$, but its spectrum plotted on a logarithm frequency scale will be identical in shape but translated in frequency. The output filters 13–16 accomplish this result. Consecutive sampling by means of gates 21–24, changes the frequency plot into a time plot, with the frequency translation becoming a time translation. The adaptive filter of FIG. 1 is then used to recognize the waveform independent of time translation. To obtain best results, the filters should have identical relative bandwiths Q. Also unit delay in the delay line should desirably be $T_{n/4n}$ where $T_n$ is the rise time of the $n^{\text{th}}$ filter. The sampling rate of sampling means 21–24 should desirably equal $T_n$. Obviously four filters are shown for illustrative purposes only.

Various alterations are possible in the FIG. 2 exemplary circuit. For example, gates 21–24 may be consecutively operated from suitable counters energized by a common oscillator, or other switching means may be used. Likewise amplitude detection is possible either before or after gating, or may be accomplished at a later point in the circuit, for example, after the common output is applied to the adaptive filter.

While we have shown and described several embodiments of our invention, it will be apparent to those skilled in the art that many other changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. An apparatus for the recognition of signals from electrical input comprising means for continuously providing the frequency spectrum of electrical input on a logarithmic scale, means consecutively scanning the amplitude of said spectrum, means for comparing one portion of one scan with a portion of another scan, and means retaining at least a proportion thereof in response to a favorable comparison between the two.

2. An apparatus for signal recognition comprising electrical input means, means for storing a reference signal sampled therefrom, means for comparing an electrical input signal from said electrical input means with said reference signal to produce a voltage indicative of the correlation therebetween and combining with said reference signal quantities proportioned to the electrical input signal which compares favorably with said reference signal, wherein said electrical input means comprises a plurality of filters for passing substantially separate frequency components of said electrical input, the frequencies of said components being spaced on a logarithmic frequency scale, and means for consecutively sampling the output of said filters.

3. An apparatus for recognition of signals received in an electrical input for the purpose of recognizing waveforms similar in shape comprising means presenting the frequency spectrum of said electrical input on a logarithmic scale, means sampling said frequency spectrum consecutively in time, and adaptive filter means receiving said sampled frequency spectrum, said adaptive filter means including storage means for storing portions of said sampled frequency spectrum and means for combining further consecutively sampled portions of said frequency spectrum with stored portions in response to similarity therebetween.

4. An apparatus for signal recognition from electrical input comprising a plurality of frequency filters receiving electrical input, each of said filters being tuned to pass a substantially separate frequency component of the electrical input, wherein said frequencies are separated on a logarithmic frequency scale, detectors for determining the amplitude of said components, an adaptive filter, and sampling means consecutively coupling the detected amplitude of said frequency components to said adaptive filter, said adaptive filter including storage means for storing frequency components and means for combining further frequency components with stored components in response to correspondence with stored components.

5. An apparatus for signal recognition comprising an input terminal for receiving a first signal, a plurality of filters receiving their input from said input terminal and for providing as outputs thereof the frequency components of electrical input wherein the frequencies of said components are spaced on a logarithmic frequency scale, sampling means consecutively sampling the output of said filters, detectors coupled to determine the respective amplitudes of sampled frequencies, coupling means receiving said detected amplitudes in common to form a sampled signal, means for storing a portion of said sampled signal as a reference signal, and means for comparing further portions of said sampled signal with said reference to produce a value indicative of correlation therebetween and for combining with said reference signal quantities proportioned to the sampled signal input comparing favorably with the reference.

References Cited by the Examiner

UNITED STATES PATENTS

| | | | |
|---|---|---|---|
| 2,465,355 | 3/1949 | Cook | 328—165 X |
| 2,958,039 | 10/1960 | Anderson | 333—29 |
| 3,114,884 | 12/1963 | Jakowatz | 238—139 X |
| 3,120,647 | 2/1964 | Bravenec | 330—70 X |

OTHER REFERENCES

Bell Telephone Systems Technical Publications, No. 3404, "Practical Application of Time Doman Theory" by Bangert, August 1959, pages 29–31, 35.

JOHN W. HUCKERT, *Primary Examiner.*

ARTHUR GAUSS, J. D. CRAIG, *Assistant Examiners.*